United States Patent
Ootorii et al.

(10) Patent No.: US 9,033,590 B2
(45) Date of Patent: May 19, 2015

(54) CONNECTOR WITH OPTICAL AND ELECTRICAL TRANSMISSION CONNECTORS AND ELECTRONICS APPARATUS UTILIZING SAME

(71) Applicant: Sony Corporation, Tokyo (JP)

(72) Inventors: Hiizu Ootorii, Kanagawa (JP); Kazuaki Toba, Kanagawa (JP); Kazuki Sano, Kanagawa (JP); Hideyuki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/660,102

(22) Filed: Oct. 25, 2012

(65) Prior Publication Data
US 2013/0108219 A1    May 2, 2013

(30) Foreign Application Priority Data
Nov. 2, 2011    (JP) ................. 2011-240830

(51) Int. Cl.
G02B 6/00    (2006.01)
G02B 6/36    (2006.01)
G02B 6/38    (2006.01)
H01R 27/02    (2006.01)
G02B 6/32    (2006.01)

(52) U.S. Cl.
CPC ............... *G02B 6/3817* (2013.01); *G02B 6/32* (2013.01); *H01R 27/02* (2013.01); *G02B 6/3853* (2013.01); *G02B 6/3885* (2013.01); *G02B 6/3897* (2013.01)

(58) Field of Classification Search
USPC .................... 385/75–77, 88–92, 147
See application file for complete search history.

(56) References Cited

U.S. PATENT DOCUMENTS

| | | | |
|---|---|---|---|
| 8,262,296 B2 * | 9/2012 | Liao et al. ........................ | 385/90 |
| 8,292,516 B2 * | 10/2012 | Little et al. ...................... | 385/76 |
| 8,469,610 B2 * | 6/2013 | Shao et al. ....................... | 385/93 |
| 2003/0053222 A1 * | 3/2003 | Togami et al. ................ | 359/726 |

FOREIGN PATENT DOCUMENTS

JP    3160707    6/2010

\* cited by examiner

*Primary Examiner* — Akm Enayet Ullah
(74) *Attorney, Agent, or Firm* — Dentons US LLP

(57) ABSTRACT

A connector includes: an electric transmission section; an optical transmission section; and a partition section provided between the electric transmission section and the optical transmission section.

13 Claims, 14 Drawing Sheets

BEFORE CONNECTION

AFTER CONNECTION

CONNECTOR WITH OPTICAL AND ELECTRICAL TRANSMISSION CONNECTORS AND ELECTRONICS APPARATUS UTILIZING SAME

BACKGROUND

The present technology relates to a connector capable of electric transmission and optical transmission, and to an electronic apparatus.

Signal transmission between devices has been performed by electric signal with use of, for example, USB (universal serial bus (registered trademark)), HDMI (high-definition multimedia interface (registered trademark)), and the like. However, in recent years, the amount of data transfer is significantly increased as the function of MPU (micro processing unit) is enhanced, and electric transmission is becoming insufficient in terms of capacity and transmission rate.

As a technology alternative to electric transmission, or a technology for use with electric transmission, a technology for optical transmission is under development. For example, Japanese Utility Model Registration No. 3160707 discloses a connector in which an optical transmission section is provided in a USB standard housing. In other words, a component for optical transmission is additionally included in a housing of an existing electric connector to maintain the specifications of the connector.

SUMMARY

However, since there is no sufficient space to accommodate a component for optical transmission in a housing of existing electric connectors of USB, HDMI, and the like, it is necessary, for example, to reduce the number of terminals for use in electric transmission, to change the layout of the terminals in order to provide an optical transmission section. Consequently, when a connector additionally provided with an optical transmission section is connected to an existing electronic apparatus (apparatus to be connected) having only electric transmission function, a component for use in optical transmission of the connector makes contact with a terminal for use in electric transmission of the electronic apparatus and causes interference, thereby raising an issue that compatibility is not maintained. That is, an issue of so-called downward compatibility is raised.

If a connector additionally provided with an optical transmission function is not adapted for downward compatibility, a user has to prepare, in addition to this connector, an existing connector having only an electric transmission function. In other words, since a large burden is imposed on a user in terms of cost and size, such a connector is eventually not employed in the unit itself, and popularization of such a connector becomes difficult.

It is desirable to provide a connector that has an electric transmission function and an optical transmission function, is connectable to an existing electronic apparatus having only an electric transmission function.

In addition thereto, it is desirable to provide an electronic apparatus that has an electric transmission function and an optical transmission function, and allows an existing connector having only an electric transmission function to be connected thereto.

A connector according to an embodiment of the present technology includes: an electric transmission section; an optical transmission section; and a partition section provided between the electric transmission section and the optical transmission section.

An electronic apparatus according to an embodiment of the present technology includes a connecting section of a type opposite to a type of a connector to be connected thereto. The connecting section includes an electric transmission section, an optical transmission section, and a partition section provided between the electric transmission section and the optical transmission section.

In the connector of the embodiment of the present technology, since the electric transmission section and the optical transmission section are separated by the partition section, the optical transmission section does not make contact with a terminal for electric transmission so as to cause no interference at the time when the connector is connected to an existing electronic apparatus having only an electric transmission function. Specifically, the electric transmission section is provided inside an electric transmission housing and the optical transmission section is provided outside the electric transmission housing, and a part of the electric transmission housing functions as the partition section. Likewise, it is also possible to connect the existing connector having only the electric transmission function to the electronic apparatus of the embodiment of the present technology while causing no interference with the terminal for electric transmission.

According to the connector of the embodiment of the present technology, since the electric transmission section and the optical transmission section are separated by the partition section, it is possible to prevent the hindrance by the optical transmission section even in the case where the connector is connected to the existing electronic apparatus having only the electric transmission function. Therefore, it is possible to connect the connector to the existing electronic apparatus having only the electric transmission function. In other words, it is possible to maintain downward compatibility. This also applies to the electronic apparatus of the embodiment of the present technology.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 1:
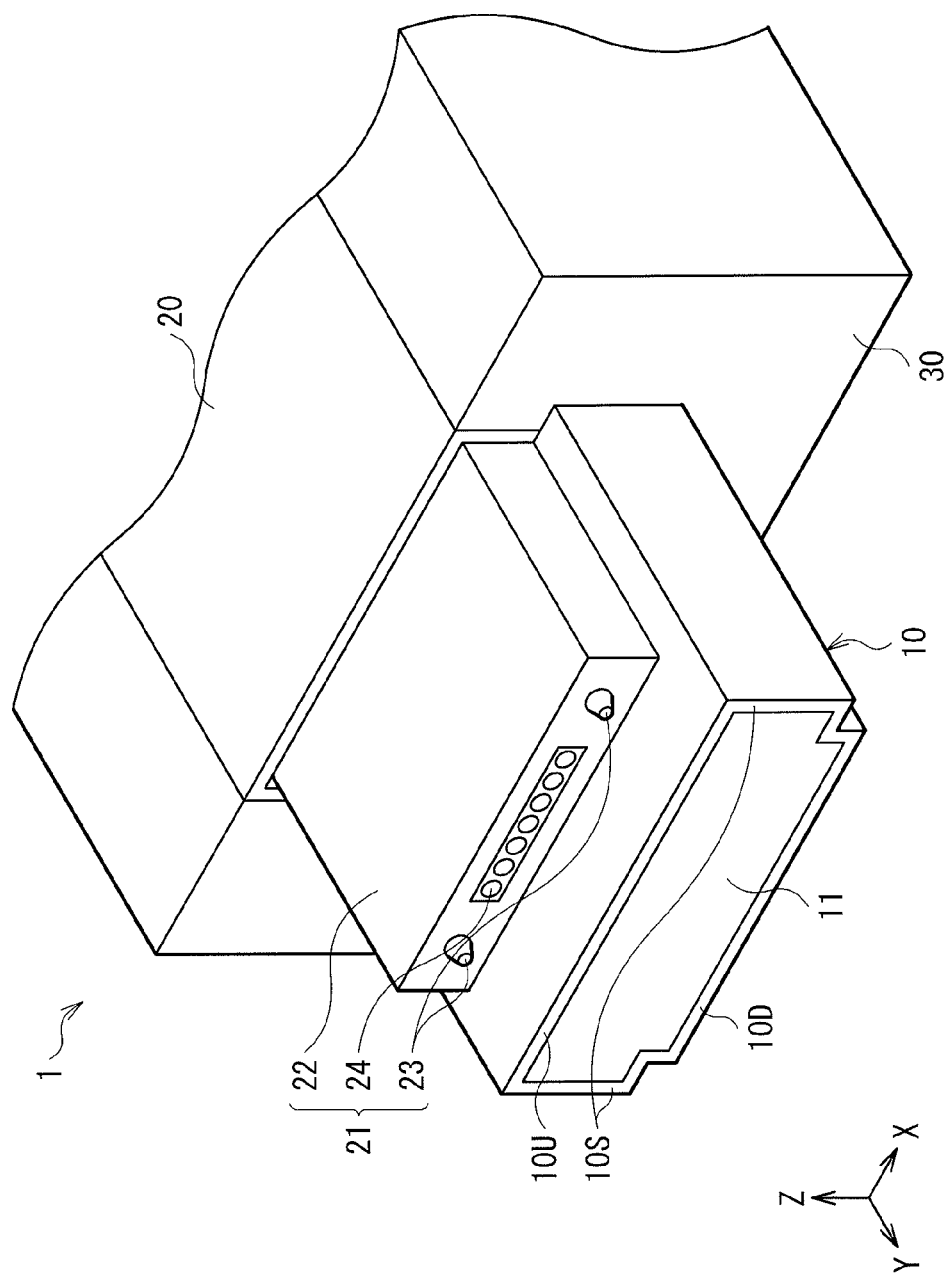
FIG. 1 is a perspective view showing a configuration of a main part of a connector according to an embodiment of the present disclosure.
Figure 2:
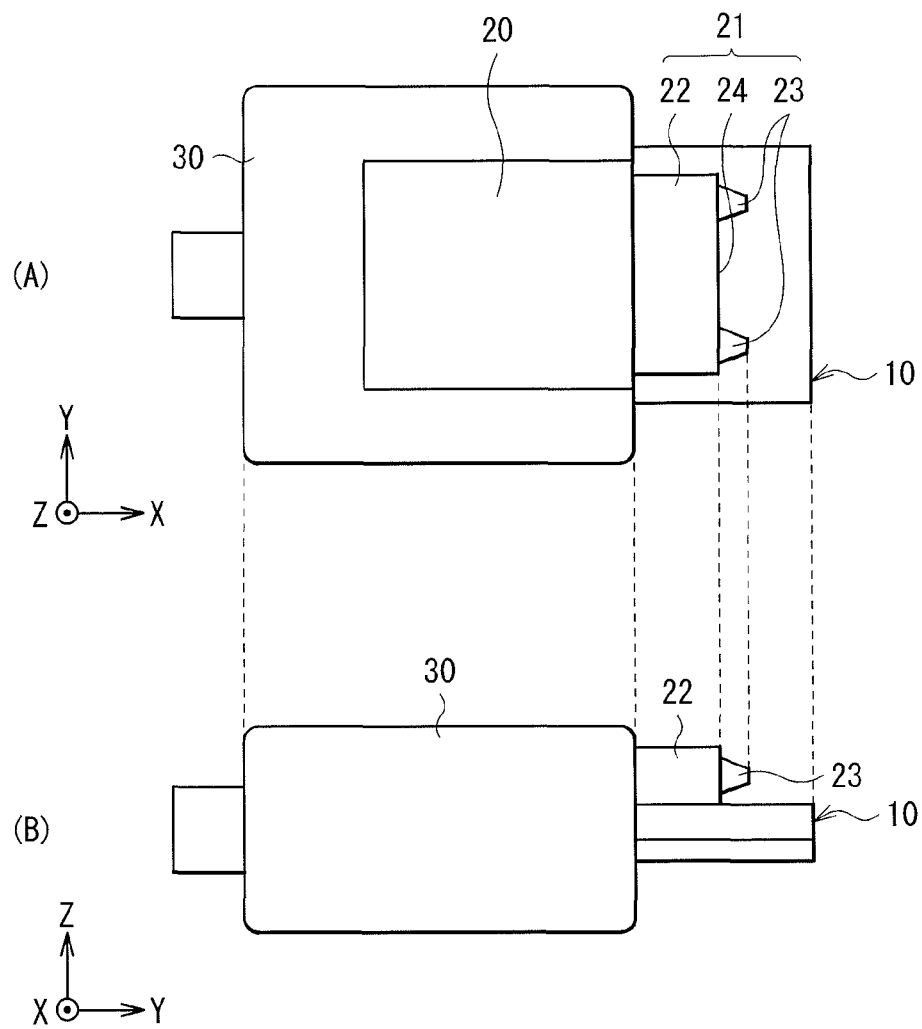

(A) of FIG. 2 is a top view of the connector illustrated in FIG. 1, and (B) of FIG. 2 is a side view of the connector.

Figure 3:
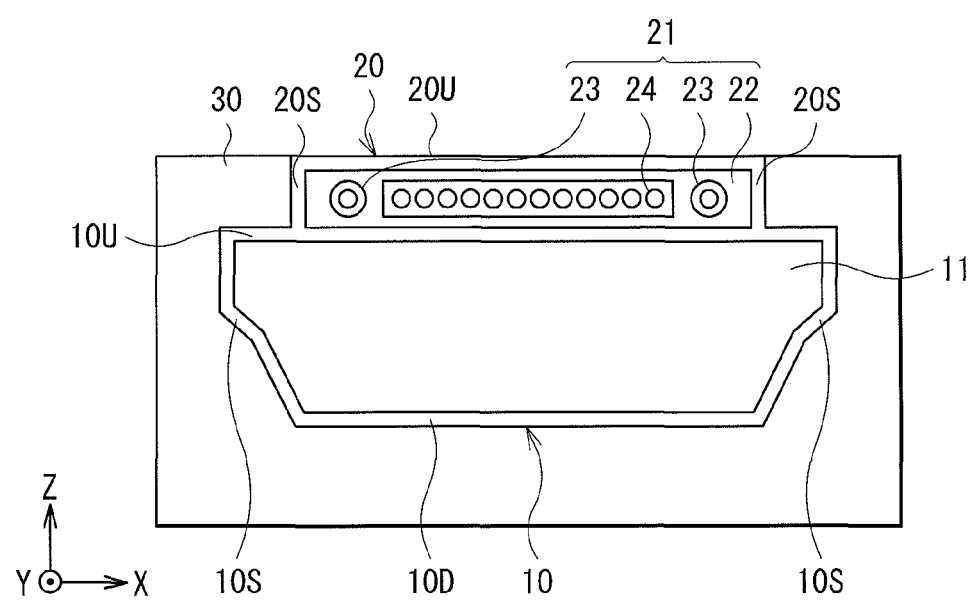

FIG. 3 is a front view of the connector illustrated in FIG. 1.

Figure 4A:
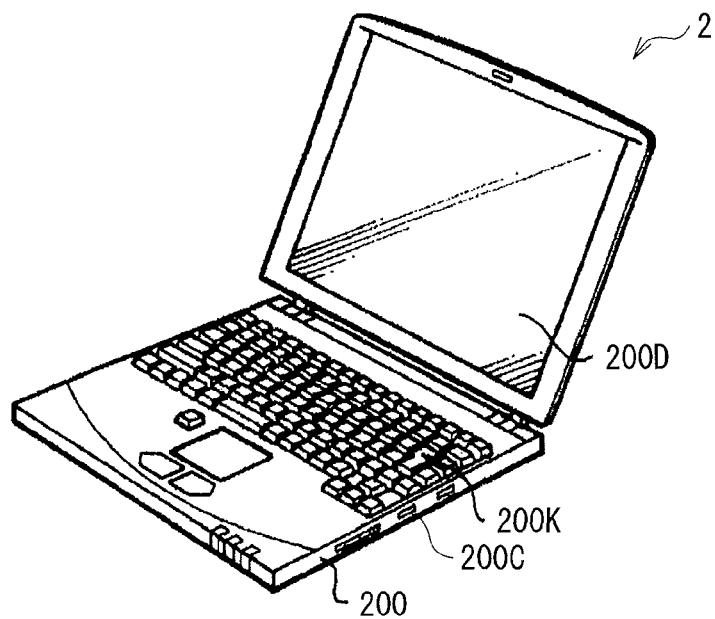
Figure 4B:
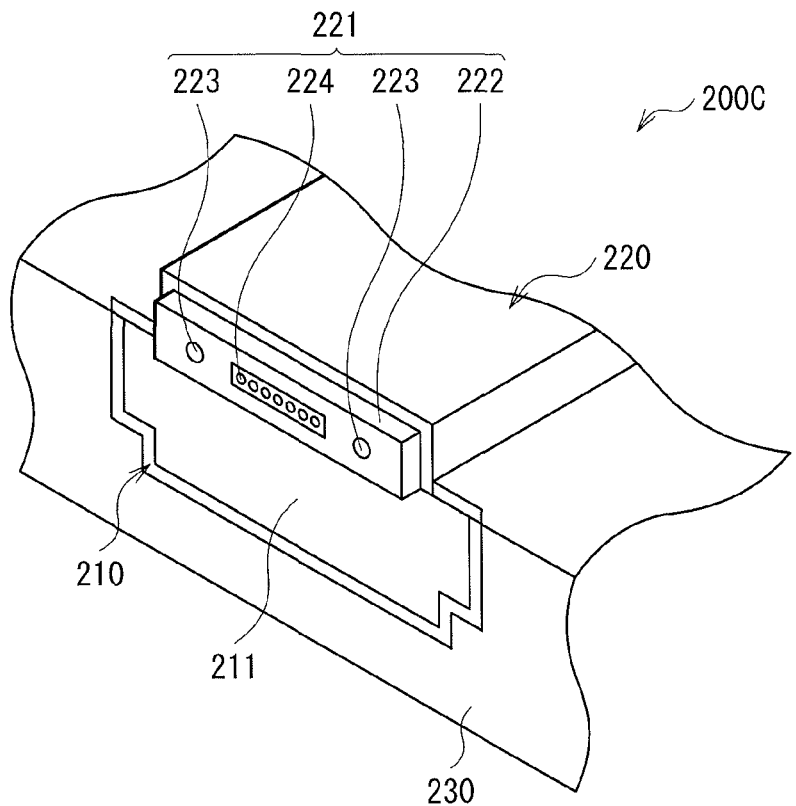

FIGS. 4A and 4B are perspective views each showing a configuration of an electronic apparatus to which the connector illustrated in FIG. 1 is connected.

Figure 5A:
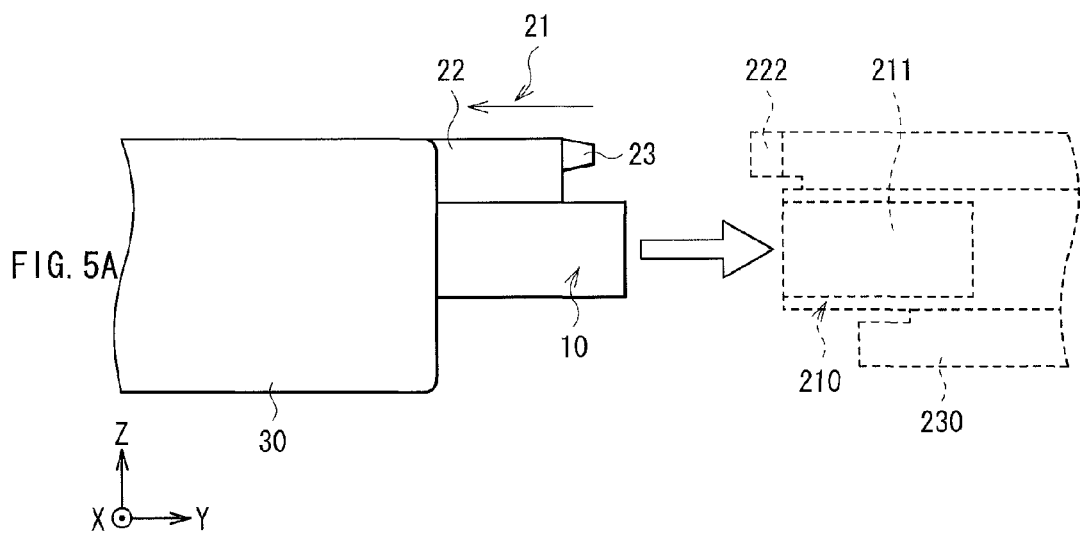
Figure 5B:
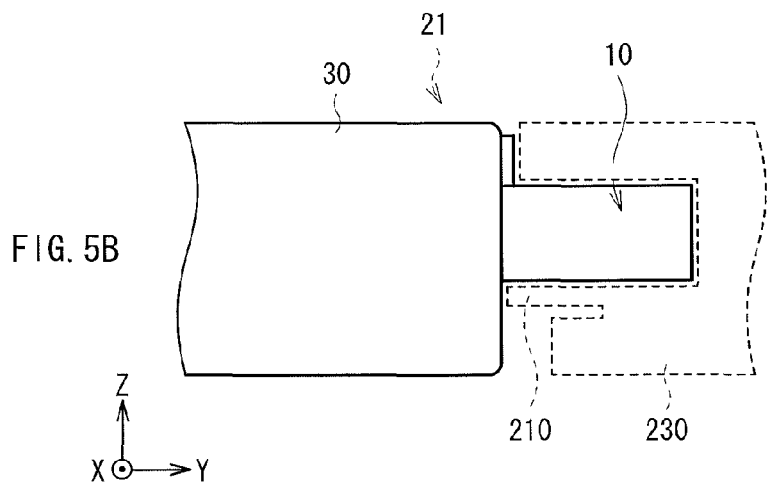

FIGS. 5A and 5B are side views showing an operation of the connector illustrated in FIG. 1 at the time when the connector is connected to the electronic apparatus illustrated in FIG. 4.

Figure 6:
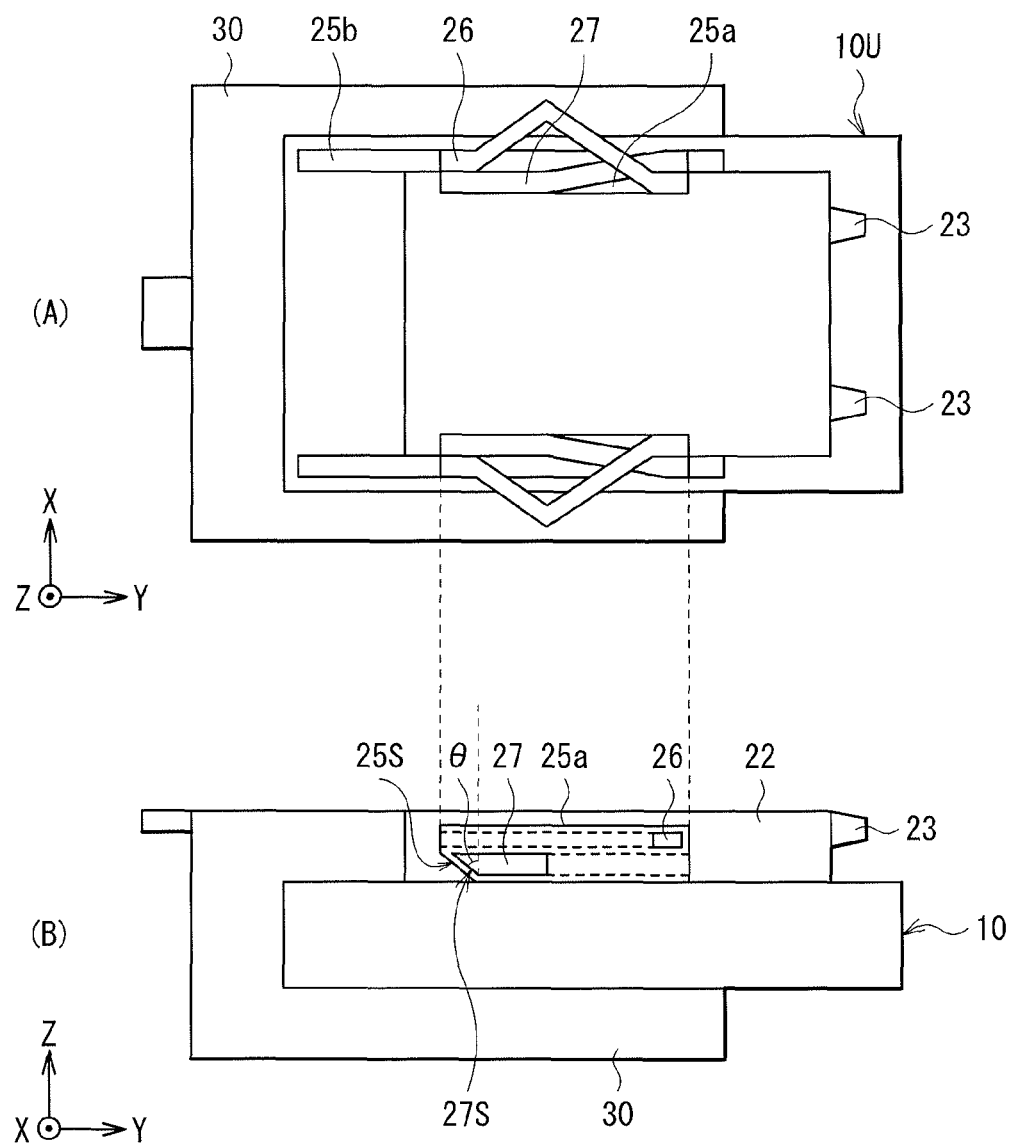

FIG. 6 is a diagram for describing a mechanism of the operation illustrated in FIGS. 5A and 5B.

Figure 7A:
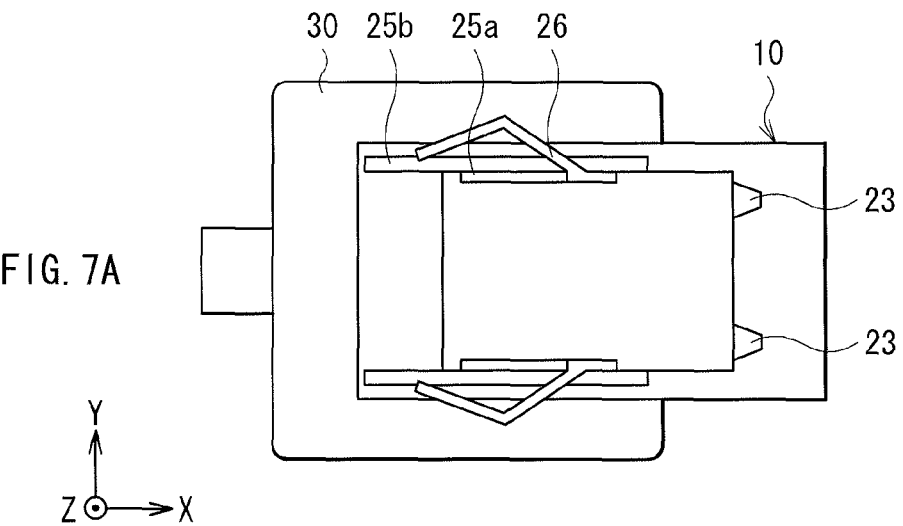
Figure 7B:
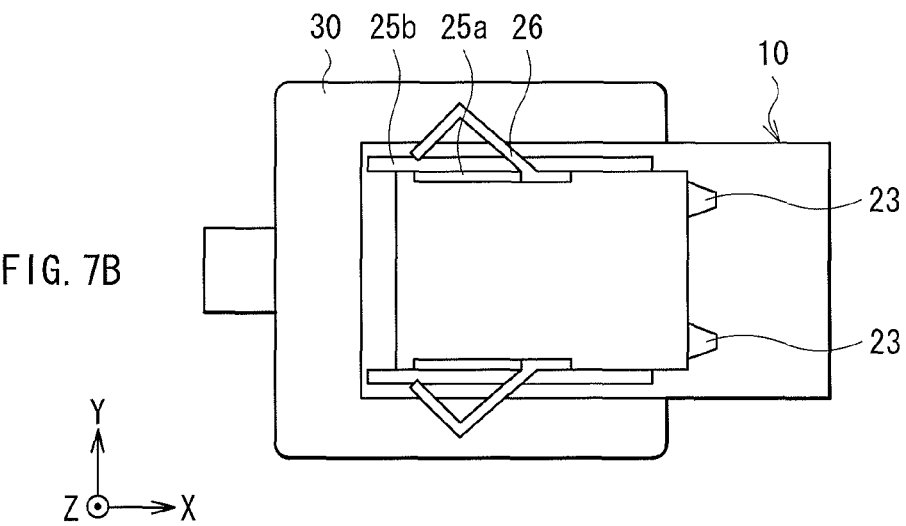

FIGS. 7A and 7B are top views each showing a configuration of a first spring member illustrated in FIG. 6.

Figure 8A:
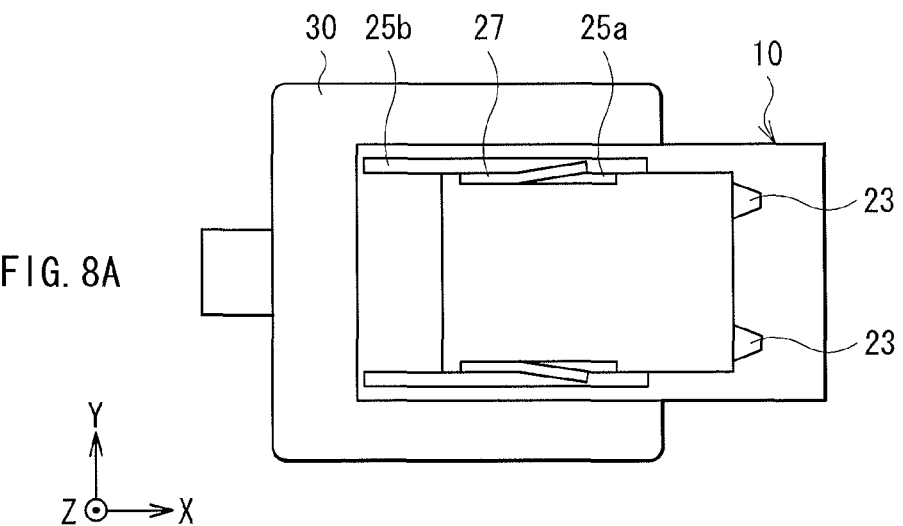
Figure 8B:
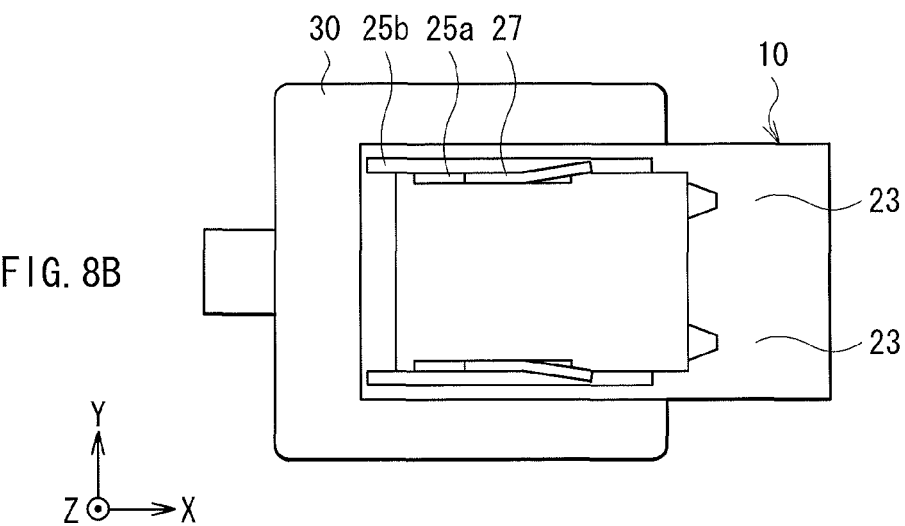

FIGS. 8A and 8B are top views each showing a configuration of a second spring member illustrated in FIG. 6.

Figure 9A:
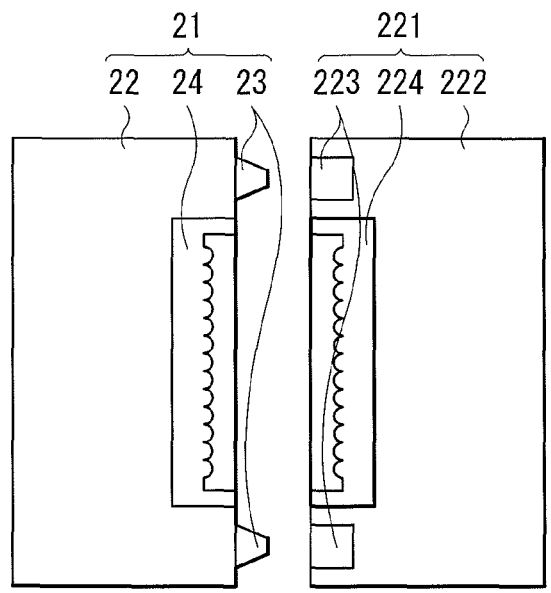
Figure 9B:
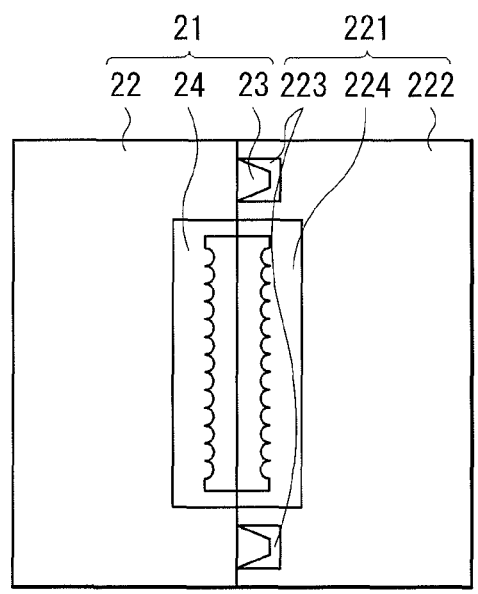

FIGS. 9A and 9B are diagrams for describing a state of a lens when the connector illustrated in FIG. 1 is connected to the electronic apparatus illustrated in FIG. 4.

Figure 10:
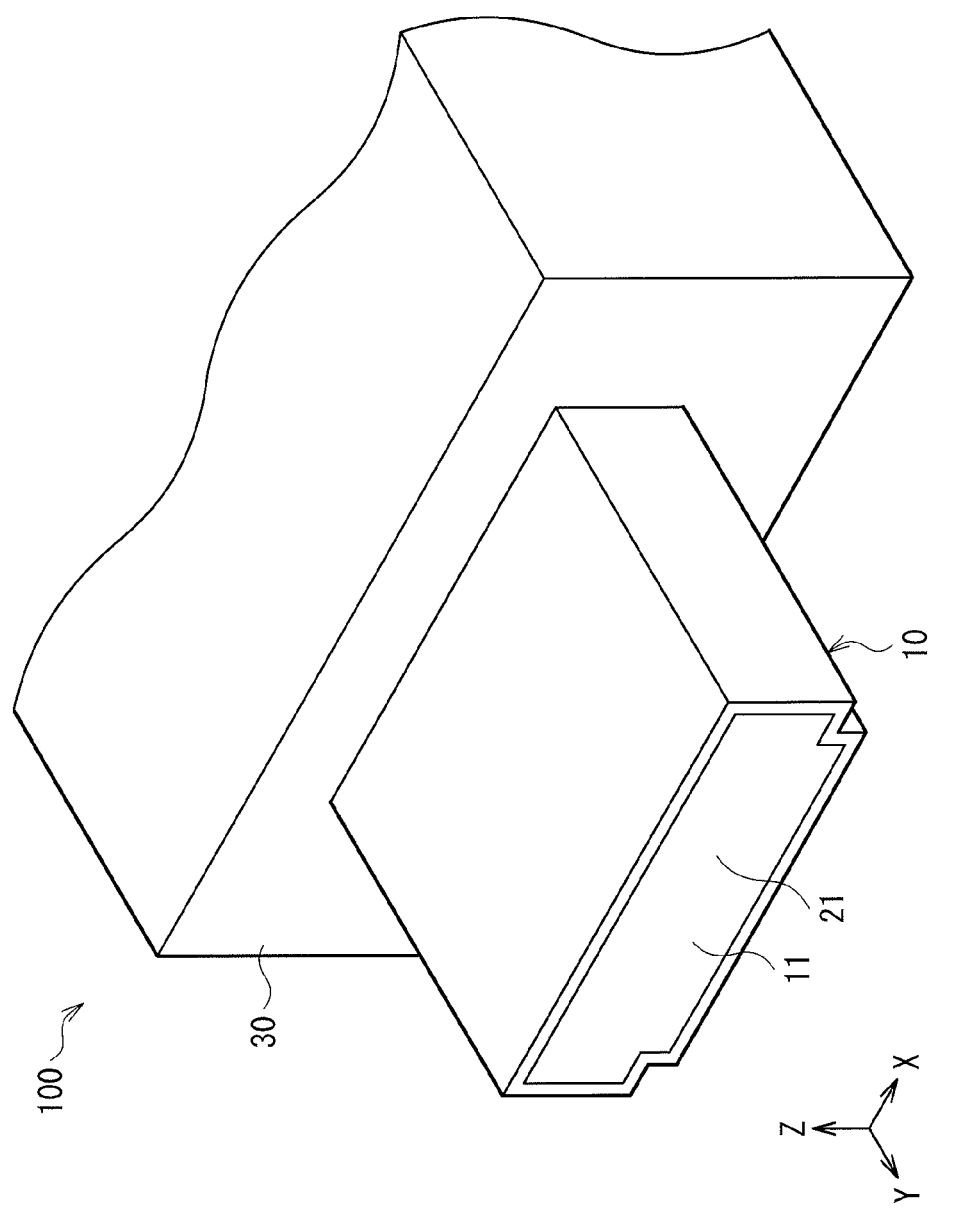

FIG. 10 is a perspective view showing a configuration of a main part of a connector according to a comparative example.

Figure 11:
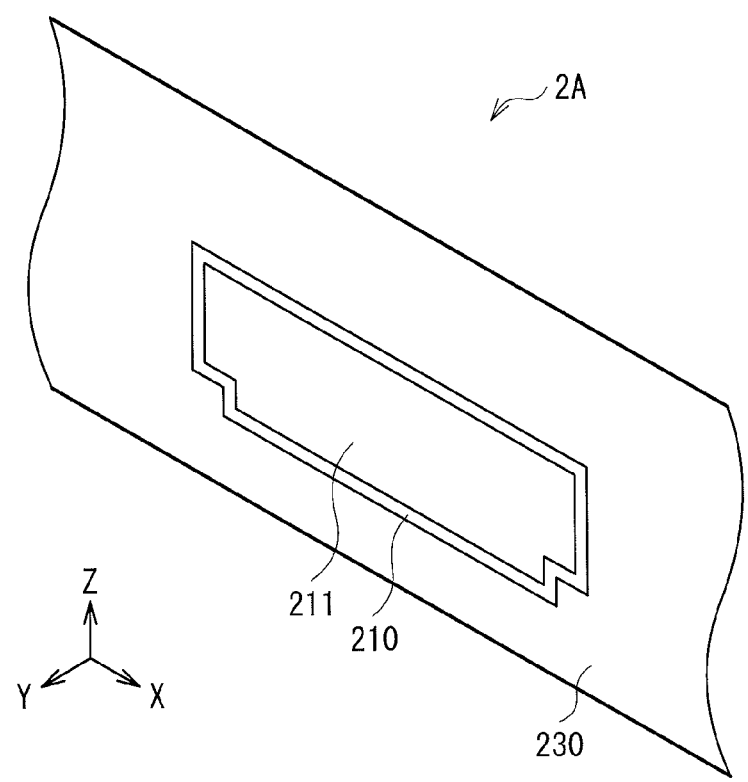

FIG. 11 is a perspective view showing a modification of a connecting section (an existing connecting section) of the electronic apparatus illustrated in FIG. 4.

Figure 12:
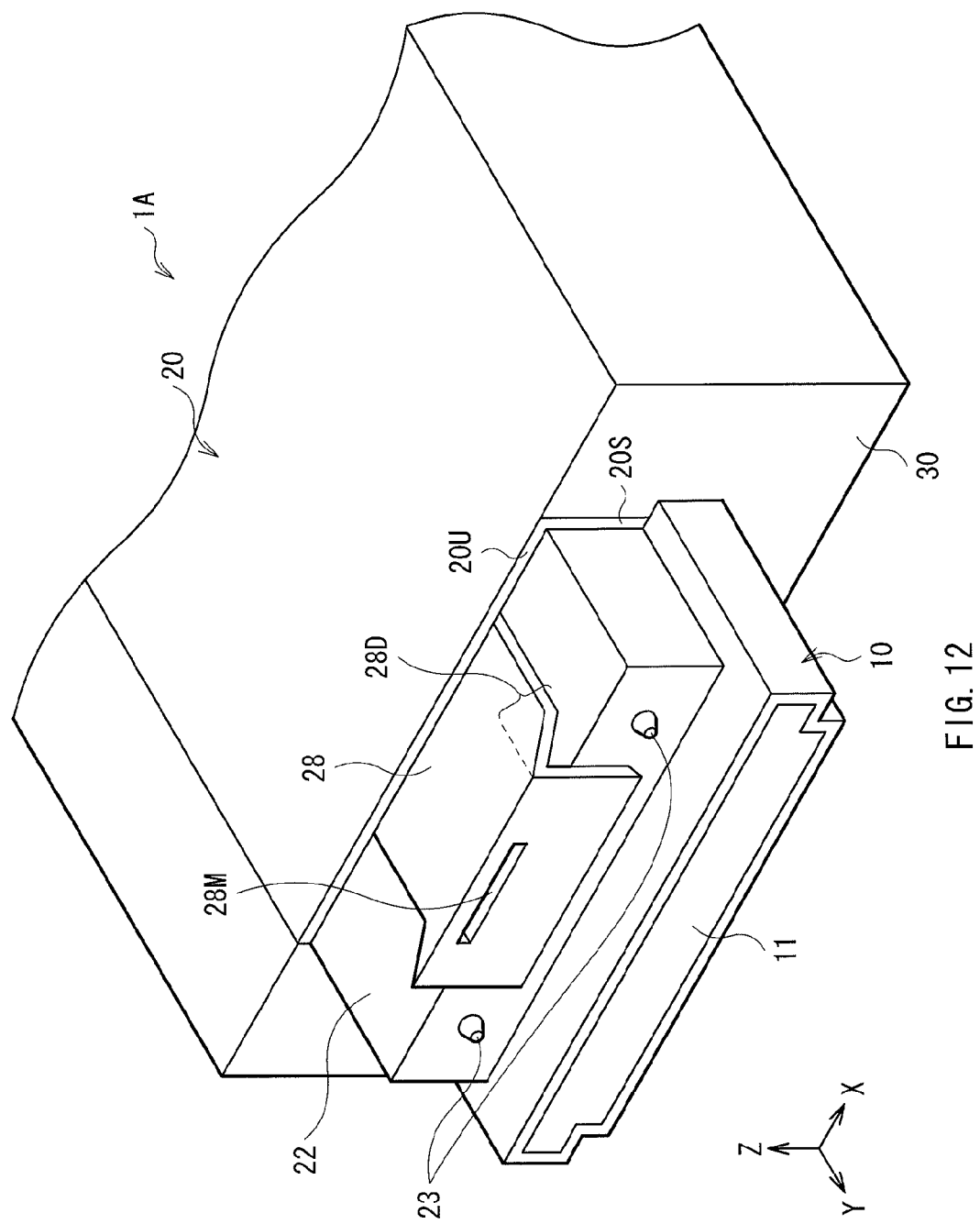

FIG. 12 is a perspective view showing a configuration of a main part of a connector according to a modification.

Figure 13:
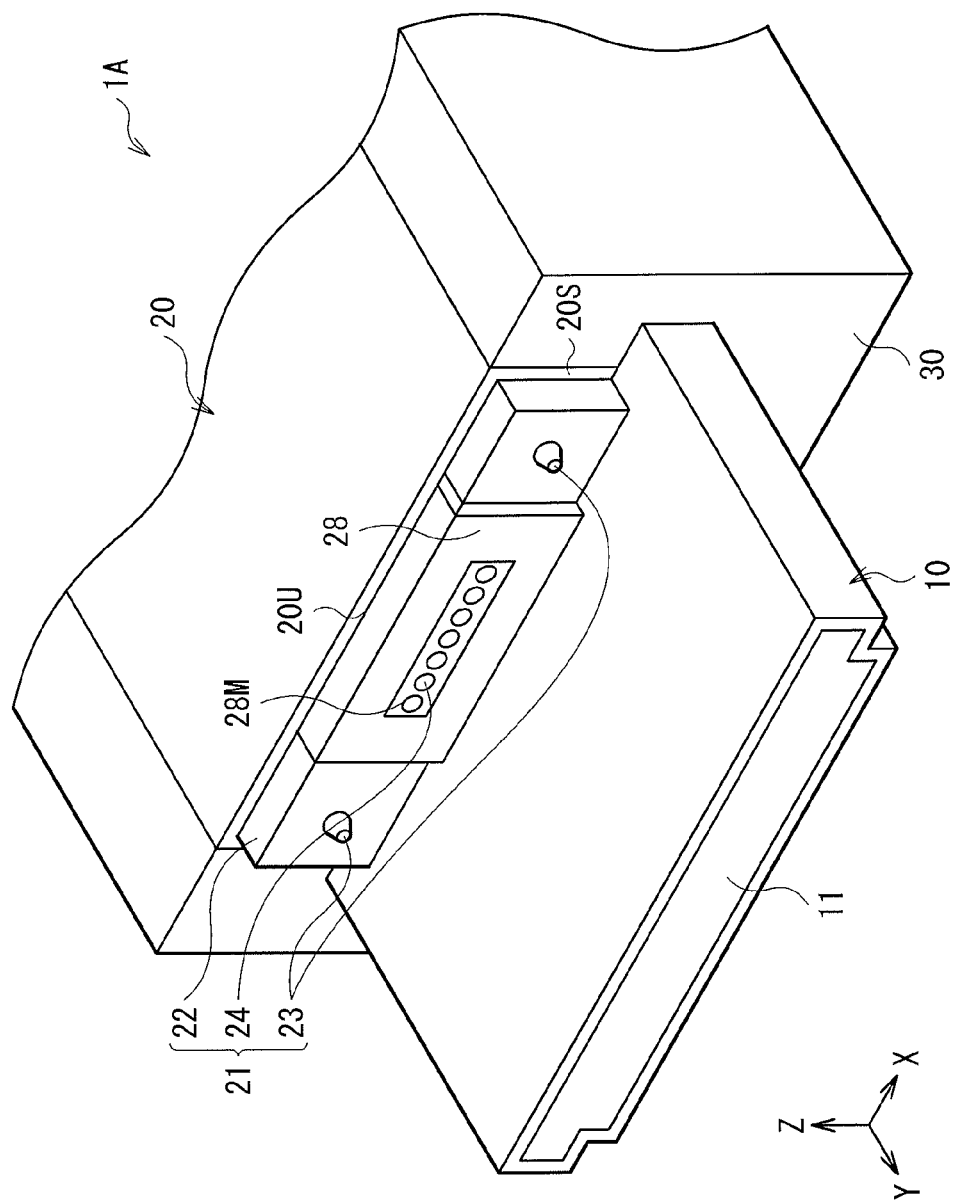

FIG. 13 is a perspective view showing a configuration of the connector illustrated in FIG. 12 when the connector is connected to an electronic apparatus.

FIGS. 14A to 14D are diagrams for describing an operation of a protective cover illustrated in FIG. 11.

DETAILED DESCRIPTION

With reference to the drawings, an embodiment of the present technology will be described in detail below. It is to be noted that description will be made in the following order.

1. Embodiment

An exemplary case where an electric transmission section is provided inside an electric transmission housing (first housing), and an optical transmission section is provided outside the electric transmission housing 2. Modification An exemplary case where a protective cover that protects lenses of an optical transmission section is adopted Embodiment FIG. 1 shows a configuration of a main section of a connector (a connector 1) according to an embodiment of the present disclosure. (A) of FIG. 2 shows a configuration of a top face (in a Z-axis direction) of the whole of the connector 1, (B) of FIG. 2 shows a configuration of a side face (in an X-axis direction) thereof, and FIG. 3 shows a configuration of a front face (in a Y-axis direction) thereof.

The connector 1 is an HDMI standard connector, for example. The connector 1 includes an electric transmission housing 10 (first housing) and an optical transmission housing 20 (second housing) that are provided on a supporting body 30. An electric transmission section 11 is accommodated in the electric transmission housing 10. An optical transmission section 21 is disposed outside the electric transmission housing 10 at a position adjacent to the electric transmission section 11 (first housing 10). The connector 1, which is a so-called male connector, is connected to an electronic apparatus (apparatus to be connected, or an electronic apparatus 2 illustrated in FIGS. 4A and 4B described later, for example) having a female connecting section to perform electric transmission and optical transmission.

The electric transmission housing 10 protrudes from an end face (front face) of the supporting body 30. The electric transmission housing 10 includes a top face 10U, a bottom face 10D facing the top face 10U, and two side faces 10S connecting the top face 10U and the bottom face 10D, and has an opening on a front face thereof, so as to be fitted to a female connector. The electric transmission housing 10 is made of a metal such as stainless-steel, for example.

The electric transmission section 11 provided in the electric transmission housing 10 includes an insulating substrate of polyimide or the like, and a plurality of electric wiring lines provided on the insulating substrate and extending along a direction in which the electric transmission housing 10 is extended (Y-axis direction), for example. The electric wiring lines are disposed based on HDMI (registered trademark) standard.

The optical transmission section 21 is provided above the electric transmission section 11 with the top face 10U (partition section) of the electric transmission housing 10 therebetween. Although details are described later, since the optical transmission section 21 is provided on the outside of the electric transmission housing 10 in the present embodiment, the connector 1 is allowed to be connected to an existing electronic apparatus having only the electric transmission function, and thus compatibility is maintained.

The optical transmission section 21 includes a slider 22 made of brass having a substantially cuboid shape, a convex portions 23 (position restriction section) provided on an front end face of the slider 22, a plurality of lenses 24 provided on an front end face of the slider 22, and an optical transmission body (not illustrated) extending in the front-rear direction (Y-axis direction) of the slider 22, for example. In other words, in the connector 1, a light transmission path is provided along the front-rear direction of the slider 22, and the lenses 24 are disposed on one end thereof.

The slider 22 is movable along the front-rear direction, and protrudes with respect to the front face of the supporting body 30 when the connector 1 is not connected to an electronic apparatus. The light transmission path is housed in the optical transmission housing 20 (the supporting body 30) when the connector 1 is connected to an electronic apparatus. By allowing the optical transmission section 21 to move relative to the optical transmission housing 20, it is possible to accurately perform the alignment of the lenses 24 (one end of the light transmission path) at the time when the connector 1 is connected to an electronic apparatus even in the case where the position of the components is varied to a certain degree at the time of manufacture. A center portion on the front end face of the slider 22 is recessed (depressed) with respect to both ends thereof, and the lenses 24 are disposed in the recessed region (FIGS. 9A and 9B described later). It is preferable to provide a space to accommodate and hold the optical transmission body bent by the slide movement of the optical transmission section 21 in an interior part of the optical transmission section 21. This prevents excessive stress from exerting on the optical transmission body.

The convex portions 23 are provided for alignment at the time when the connector 1 is connected to an electronic apparatus. Two convex portions 23 are provided on the both ends on the front end face of the slider 22. The convex portions 23 are inserted in respective concave portions (concave portions 223 illustrated in FIG. 4B) provided to an optical transmission section of the electronic apparatus, and thus, the connector 1 is fixed at the accurate position. It is preferable to suppress the positional displacement between the lens 24 of the connector 1 and a lens of the electronic apparatus (lenses 224 illustrated in FIG. 4B) to 50 μm or less, and more preferably, 15 μm or less. The convex portions 23 each have a substantially conical shape or a truncated conical shape, and specifically, the convex portions 23 each have a tapered shape in which the diameter of the circular cross-section is decreased along a direction away from the slider 22. This makes the insertion into the concave portion easy. The convex portions 23 protrude with respect to the front end face of the slider 22 by about 1 mm, for example.

The lens 24 is a collimating lens that converts light emitted from the optical transmission body into parallel light, or collects light (parallel light) entered from the electronic apparatus at an end portion of the optical transmission body. The plurality of lenses 24 are disposed along the front end face of the slider 22 (X-axis direction) at intervals of 250 µm, for example. At the time when the connector 1 is connected to an electronic apparatus, the lenses 24 face respective lenses (the lenses 224) of the electronic apparatus. The optical transmission body is provided so as to correspond to the focal point of the lens 24, and optically connected to the lens 24. Light entered from the lens 24 is propagated through the optical transmission body, or light propagated through the optical transmission body is emitted to the lens of the electronic apparatus through the lenses 24. The optical transmission body is, for example, an optical fiber or the like, and is configured of quartz, a glass material, a fluorinated polymer, an acrylic polymer, or the like.

When the connector 1 is not connected to an electronic apparatus, the lens 24 (one end of the light transmission path) protrudes with respect to the front face of the supporting body 30 so as to be positioned between the front end face of the supporting body 30 and the front end face of the electric transmission housing 10 (a first position). At the time when the connector 1 is connected to an electronic apparatus, the lenses 24 moves back to the inside (a second position) of the optical transmission housing 20 provided to the supporting body 30 by the slide mechanism of the optical transmission section 21.

The optical transmission housing 20 is provided above the electric transmission housing 10, and the front face and the top face (a top face 20U described later) thereof are flush with the front face and the top face of the supporting body 30. In other words, the optical transmission housing 20 is provided so as to be embedded in the supporting body 30. Similarly to the electric transmission housing 10, the optical transmission housing 20 has an opening at the front face thereof, and the optical transmission section 21 is housed from this opening. The optical transmission housing 20 is configured of a top face 20U and two side faces 20S, and the bottom face thereof is configured of the top face 10U of the electric transmission housing 10. Similarly to the electric transmission housing 10, the optical transmission housing 20 is also made of a metal such as stainless-steel, for example.

FIG. 4A shows an external appearance of the electronic apparatus 2 to which the connector 1 is connected. The electronic apparatus 2 is a notebook personal computer, and, for example, includes a main body 200, a keyboard 200K for inputting letters and the like, and a display section 200D that displays an image. The electronic apparatus 2 is further provided with a connecting section 200C (a female connecting section) the type of which is opposite to that of the connector 1. As illustrated in FIG. 4B, the connecting section 200C has substantially the same configuration as that of the connector 1, and an electric transmission section 211 is housed in an electric transmission housing 210 and an optical transmission section 221 is housed in an optical transmission housing 220. In other words, it is possible to connect, to the electronic apparatus 2, not only the connector 1 having the optical transmission function, but also an existing connector having only the electric transmission function. The connecting section 200C is different from the connector 1 in that the electric transmission housing 210 has a concave shape in which the electric transmission housing 10 (the electric transmission section 11) of the connector 1 may be housed and in that the optical transmission section 221 includes the concave portions 223 (position restriction sections) in place of the convex portions 23. Each of the concave portions 223 may have a shape the diameter of which does not vary along the depth direction, or a tapered shape corresponding to the convex portion 23.

FIGS. 5A and 5B show a variation of the connector 1 between before and after the connecting of the connector 1 to the electronic apparatus 2. FIGS. 5A and 5B correspond to before and after the connecting, respectively. As described above, the optical transmission section 21 is movable, and at the time when the connector 1 is connected to the electronic apparatus 2, the optical transmission section 21 is moved back, and the light transmission path is housed in the optical transmission housing 20 (the supporting body 30).

FIGS. 6 to 8B show the mechanism of this movement. As illustrated in (A) of FIG. 6, the slider 22 is provided with a slide trench 25a, and the top face 10U is provided with a slide wall 25b. The slider 22 moves along the slide trench 25a and the slide wall 25b. A first spring member 26 and a second spring member 27 integrally provided to the top face 10U of the electric transmission housing 10 bias the slider 22 from the second position to the first position (forward), and stop the slider 22 at the first position.

As shown in FIGS. 7A and 7B, when the connector 1 connected to the electronic apparatus 2 (FIG. 7B) is pulled out, the slider 22 is pushed out forward by the elastic force of the first spring member 26 (FIG. 7A). Then, an end portion (an inclined face 27S illustrated in (B) of FIG. 6) of the second spring member 27 comes into contact with the slider 22, thereby locking the biased slider 22 at the first position (FIG. 8A). This locking state is released when the connector 1 is connected to the electronic apparatus 2 (FIG. 8B).

(B) of FIG. 6 shows a configuration of a side face of (A) of FIG. 6. The second spring member 27 is provided on the lower side of the slide trench 25a relative to the first spring member 26, and an end face (the inclined face 27S) of the second spring member 27 has an inclination angle θ with respect to the normal to the top face 10U. The angle θ is, for example, about 30 to 70 degrees, and preferably 45 degrees. An contact face (an inclined face 25S) of the slide trench 25a (the slider 22) and the second spring member 27 is inclined along the angle θ. By providing the second spring member 27 with the inclined face 27S in this manner, the slider 22 is pressed against and brought into close contact with the electric transmission housing 10 (the top face 10U), and the state of the slider 22 stopped at the first position is stabilized. Specifically, the slider 22 is stopped at the first position in a state where the clearance of the slider 22 is eliminated. The electric transmission housing 10, the optical transmission housing 20, the first spring member 26, and the second spring member 27, are manufactured by integral molding of a sheet metal, and are fixed to the supporting body 30 by a jig and the like, for example. With use of such an integral molding, replacement is easily achieved when a defect occurs. In order to avoid deformation of metal, it is possible to use ceramic materials to form the electric transmission housing 10, the optical transmission housing 20, the first spring member 26, and the second spring member 27.

In the connector 1, when the electric transmission housing 10 is fitted to the electric transmission housing 210 of the electronic apparatus 2, the electric transmission section 11 of the connector 1 is connected to the electric transmission section 211 of the electronic apparatus 2 and electric transmission is performed, and in addition, optical transmission is performed as follows. Specifically, when the electric transmission housing 10 and the electric transmission housing 210 are connected together, the optical transmission section 21 and the optical transmission section 221 come closer to each other as illustrated in FIG. 9A, and the light transmission path is housed in the optical transmission housing 20 (FIG. 5B). Next, as illustrated in FIG. 9B, the convex portions 23 are inserted into the concave portions 223, and the lenses 24 and the lenses 224 are accurately aligned and fixed. At this time, since the regions where the lenses 24 of the slider 22 and the lenses 224 of the slider 222 are disposed are recessed relative to the both ends of the sliders 22 and 222, the lenses 24 and the lenses 224 are not brought into contact with each other, but sealed when the sliders 22 and 222 come into contact. When light (parallel light) is emitted from the electronic apparatus 2 (the lenses 224) in this state, this light is propagated in the sealed space, and collected at the end portion of the optical transmission body by the lenses 24. Further, the light is transmitted through the optical transmission body, and inputted to an electronic apparatus at the other end connected with the optical transmission body. This also applies to the case where a light signal is inputted from the electronic apparatus at the other end to the electronic apparatus 2. In this instance, since the optical transmission section 21 is provided outside the electric transmission housing 10 provided with the electric transmission section 11, it is possible to connect the connector 1 to the existing electronic apparatus (unit to be connected) which has only the electric transmission function and includes no optical transmission section. This point is described below with reference to a comparative example.

FIG. 10 shows a configuration of a connector (a connector 100) according to the comparative example. Since, in the connector 100, the optical transmission section 21 is provided inside the electric transmission housing 10 together with the electric transmission section 11, the connector 100 is not allowed to be connected to an electronic apparatus 2A (FIG. 11) having only the electric transmission section 211, and another connector has to be prepared. There is no sufficient space to accommodate a component for optical transmission in the existing housings compliant with USB, HDMI, and the like and the layout of electric wiring lines of the electric transmission section 211 of the connector 100 is different from the existing layout. Consequently, when the connector 100 is connected to the electronic apparatus 2A, the component of the optical transmission section 21 makes contact with the electric wiring lines of the electric transmission section 211, thereby causing interference.

In contrast, in the connector 1 of the present embodiment, since the optical transmission section 21 is provided outside the electric transmission housing 10, there is no necessity to change the layout of the electric wiring lines of the electric transmission section 11 of the electric transmission housing 10. In addition thereto, there is no possibility that the component of the optical transmission section 21 interferes with the electric wiring lines of the electric transmission section 211 when the connector 1 is connected to the electronic apparatus 2A. In other words, downward compatibility is assured.

As described above, since the optical transmission section 21 is provided outside the electric transmission housing 10 in the present embodiment, it is possible to prevent the hindrance by the optical transmission section 21 even in the case where the connector is connected to the existing electronic apparatus 2A having only the electric transmission function. Thus, the connector 1 has the electric transmission function and the optical transmission function, and in addition, the connector 1 can be connected to the existing electronic apparatus 2A having only the electric transmission function. In other words, the connector 1 assures downward compatibility.

In addition, by allowing the optical transmission section 21 to move between the first position and the second position, it is possible to accurately perform the alignment of the lenses 24 (the light transmission path) at the time when the connector 1 is connected to an electronic apparatus even in the case where the position of the components is varied to a certain degree at the time of manufacture.

Further, since the first spring member 26 and the second spring member 27 that allow the movement of the optical transmission section 21, the electric transmission housing 10, and the optical transmission housing 20 are formed by integral molding, cost is reduced, and in addition, replacement is easily achieved when a defect occurs.

In a modification of the present technology described below, the same components as those of the above-mentioned embodiment are given the same symbols, and their descriptions will be omitted.

Modification

FIG. 12 and FIG. 13 each show a configuration of a connector (a connector 1A) according to a modification. FIG. 12 shows a state where the connector 1A is not connected to an electronic apparatus, and FIG. 13 shows a state where the connector 1A is connected to an electronic apparatus. The connector 1A is different from the connector 1 of the above-mentioned embodiment in that the optical transmission section 21 is provided with a protective cover 28 that protects the lenses 24. Elastic materials may be used to form the protective cover 28, and for example, the protective cover 28 is configured of a spring steel having a thickness of 0.1 mm.

The protective cover 28 is provided between the top face of the slider 22 and the top face 20U of the optical transmission housing 20 so as to cover the top face and a center portion (the lenses 24) of the front end face of the slider 22. When the connector 1A is not connected to an electronic apparatus (FIG. 12), the protective cover 28 is in contact with the slider 22 and protects the lenses 24. The protective cover 28 includes, as a part thereof, an inclination section 28D that is upwardly inclined from the top face of the slider 22 so as to be spaced away from the slider 22. The protective cover 28 is displaced by the inclination section 28D at the time when the connector 1A is connected to an electronic apparatus (FIG. 13).

In addition, the protective cover 28 includes an opening 28M. The opening 28M is disposed at a position facing the lenses 24 (FIG. 13) when the connector 1A is connected to an electronic apparatus, and is disposed at a position, for example, about 0.5 mm above the lenses 24 (FIG. 12) when the connector 1A is not connected to an electronic apparatus. In this way, it is possible to prevent the protective cover 28 from hindering the transmission of light when the connector 1A is connected to an electronic apparatus.

Figure 14A:
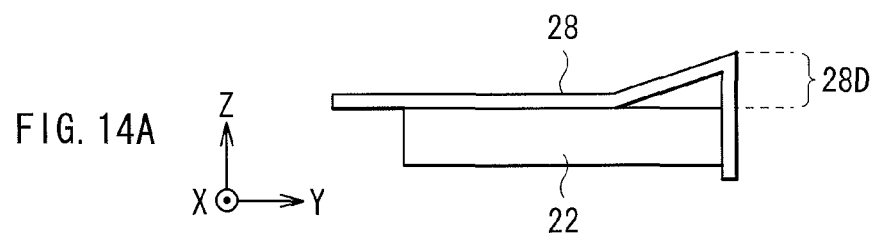
Figure 14B:
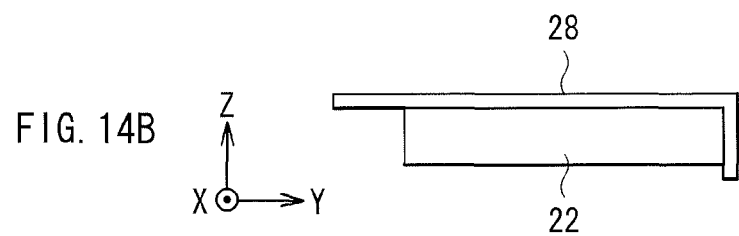
Figure 14C:
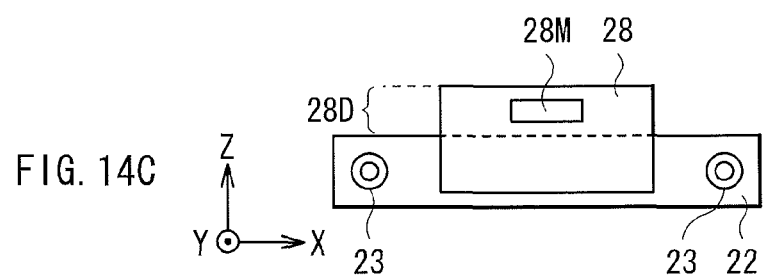
Figure 14D:
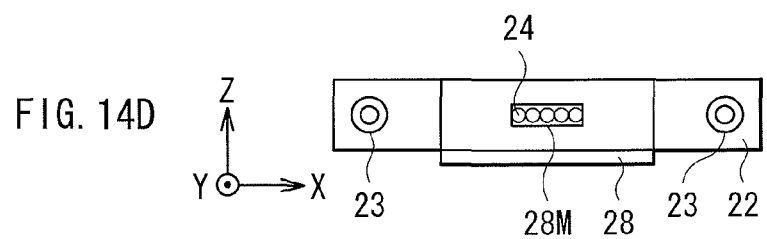

FIG. 14A and FIG. 14C are a side view and a front view, respectively, of the optical transmission section 21 and the protective cover 28 when the connector 1A is not connected to an electronic apparatus. FIG. 14B and FIG. 14D are a side view and a front view, respectively, of the optical transmission section 21 and the protective cover 28 when the connector 1A is connected to an electronic apparatus. The protective cover 28 interlocks with the slide movement of the slider 22, and when the slider 22 moves backward (from the first position to the second position), the inclination section 28D (FIG. 14A) is brought into contact with the top face 20U (the inner wall face of the supporting body 30) and pushed down, and then brought into close contact with the slider 22 (FIG. 14B). At this time, the opening 28M (FIG. 14C) located above the lenses 24 is moved downward to a position facing the lenses 24 along with the downward movement of the inclination section 28D (FIG. 14D). When the slider 22 moves forward (from the second position to the first position), the inclination section 28D of the protective cover 28 is upwardly spaced away from the slider 22.

In the present modification, by providing the protective cover 28, the lenses 24 exposed from the optical transmission housing 20 is protected from breakage and dirt when the connector 1A is not connected to an electronic apparatus. In addition thereto, by providing the inclination section 28D and the opening 28M, it is possible to readily prevent the protective cover 28 from hindering the transmission of light when the connector 1A is connected to an electronic apparatus.

Further, by providing the single spring steel with the opening 28M as mentioned above to protect and expose the lenses 24, cost is reduced, and in addition thereto, it is possible to reduce the occurrence of defects in comparison with the case where a plurality of components are combined.

As the protective cover 28, a spring coupled to a teflon (registered trademark) sheet or the like may also be adopted to implement the above-mentioned operation, for example.

Hereinabove, although the present technology has been described with reference to the embodiment and the modification, the present technology is not limited to the above-mentioned embodiment and so forth, and various modifications may be made. For example, although the HDMI standard connectors 1 and 1A are exemplified in the above-mentioned embodiment, connectors of other standards may also be adopted as long as a space to form the optical transmission section 21 in the supporting body 30 is ensured. In addition, although the case where the optical transmission section 21 is provided on the upper side of the electric transmission housing 10 is exemplified in the above-mentioned embodiment and so forth, the optical transmission section 21 may be disposed at other positions.

Further, although the case where the connector 1 and the electronic apparatus 2 are connected together has been described in the above-mentioned embodiment and so forth, devices in an electronic apparatus may be connected together by the connector 1. In addition, the electronic apparatus 2 may be electronic apparatuses other than the notebook personal computer. Additionally, for example, the connector 1 may be a USB (registered trademark) memory and/or the like without a cable.

Moreover, for example, the material, thickness, forming method, forming condition of the components described in the above-mentioned embodiment are not limitative, and other materials, thicknesses, forming methods, and forming conditions may also be adopted.

It is possible to achieve at least the following configurations from the above-described example embodiments and the modifications of the disclosure.

(1) A connector including:
an electric transmission section;
an optical transmission section; and
a partition section provided between the electric transmission section and the optical transmission section.

(2) The connector according to (1), wherein
the electric transmission section is provided inside a first housing and the optical transmission section is provided outside the first housing, and
the partition section is configured of a part of the first housing.

(3) The connector according to (2), further including a second housing in which the optical transmission section slides, wherein
the optical transmission section includes a lens at an end of a light transmission path, and the lens is disposed at a first position located forward of a front face of the second housing, the lens moving back to a second position located inside the second housing when the connector is connected to an apparatus as a connection target.

(4) The connector according to (3), further including:
a first spring member biases the optical transmission section from the second position toward the first position, and
a second spring member stopping the optical transmission section at the first position.

(5) The connector according to (4), wherein
a contact face, of the second spring member, being in contact with the optical transmission section has an inclination with respect to a normal to the partition section, and
a contact face, of the optical transmission section, being in contact with the second spring member conforms to the inclination.

(6) The connector according to (4) or (5), wherein the first housing, the second housing, the first spring member, and the second spring member are integrated.

(7) The connector according to any one of (3) to (6), further including a protective cover covering a top face and a front end face of the optical transmission section, wherein
the lens is provided on the front end face of the optical transmission section, and
the protective cover includes an inclination section and an opening, thereby protecting the lens when the optical transmission section is disposed at the first position, the inclination section being spaced away from the optical transmission section in an upward direction, the opening being located above a position facing the lens.

(8) The connector according to (7), wherein, when the optical transmission section moves back to the second position, the inclination section of the protective cover comes into contact with an inner wall face of the second housing and moves downward, and the opening of the protective cover faces the lens.

(9) The connector according to any one of (1) to (8), wherein the optical transmission section includes a position restriction section performing alignment at a time when the connector is connected to an apparatus as a connection target.

(10) The connector according to (9), wherein the position restriction section is a tapered convex portion.

(11) An electronic apparatus including a connecting section of a type opposite to a type of a connector to be connected thereto, wherein
the connecting section includes
an electric transmission section,
an optical transmission section, and
a partition section provided between the electric transmission section and the optical transmission section.

The present disclosure contains subject matter related to that disclosed in Japanese Priority Patent Application JP 2011-240830 filed in the Japan Patent Office on Nov. 2, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof

What is claimed is:
1. A connector comprising:
an electric transmission connector;
an optical transmission connector; and
a partition between the electric transmission connector and the optical transmission connector,
wherein, the optical and electrical transmission connectors are positioned on above the other in a first direction, the optical transmission connector slides relative to the electrical transmission connector in a second direction orthogonal to the first direction, and the electrical transmission connector extends fixedly from a body while the optical transmission connector slides in and out of the body.

2. The connector according to claim 1, wherein:

the electric transmission connector is provided inside a first housing extending from the body and the optical transmission connector is provided outside the first housing, and the partition section is a part of the first housing.

3. The connector according to claim 2, further comprising a second housing in which the optical transmission connector slides, wherein,
the optical transmission connector includes a lens at an end of a light transmission path thereof, and
the lens is disposed at a first position located forward of a front face of the second housing when the connector is not connected to a mating connector, the lens is disposed at a second position located inside the second housing when the connector is connected to a mating connector.

4. The connector according to claim 3, further comprising:

a first spring member that biases the optical transmission connector from the second position toward the first position, and a second spring member that stops the optical transmission section at the first position.

5. The connector according to claim 4, wherein:

the second spring member has a contact face in contact with the optical transmission connector, the contact face being inclined with respect to normal to the partition section, and the optical transmission connector has a contact face in contact with the second spring member, the contact face of the optical transmission connector conforming to the inclination of the contact face of the second spring member.

6. The connector according to claim 4, wherein the first housing, the second housing, the first spring member, and the second spring member are integrated.

7. The connector according to claim 3, further comprising a protective cover covering a top face and a front end face of the optical transmission connector, wherein, the lens is provided at a front end face of the optical transmission connector, and the protective cover includes a first portion positionable on the front end face of the optical transmission section and a second portion extending over a top of the optical transmission connector, the second portion having an inclined section to which the first portion is attached, the inclined portion normally holding the first portion in a first state when the optical transmission connector is outside of the second housing and a second state when the optical transmission connector is inside of the second housing, the first portion having an opening, the opening not coinciding with the lens and the first portion protecting the lens when in the first state, the opening coinciding with the lens to allow communication with the lens when in the second state.

8. The connector according to claim 7, wherein, when the optical transmission connector moves to the second position, the inclined section of the protective cover comes into contact with an inner wall face of the second housing and is caused to flatten and overlay the opening of the protective cover faces over the lens.

9. The connector according to claim 1, wherein the optical transmission connector includes a position restriction section performing alignment at a time when the connector is connected to a mating connector.

10. The connector according to claim 9, wherein the position restriction section is a tapered convex portion.

11. An electronic apparatus comprising a connector, the connector comprising:

a female electric transmission connector, an optical transmission connector, and a partition section between the electric transmission connector and the optical transmission connector, wherein, the electrical and optical transmission connector are positioned one above the other is a first direction, the electrical transmission connector includes a housing within which is received a mating male electrical transmission connector, and the optical transmission connector extends beyond the housing in a second direction orthogonal to the first direction.

12. The connector of claim 1, wherein the optical transmission connector includes two alignment protrusions extending from an end face thereof.

13. The apparatus of claim 11, wherein the optical transmission connector includes two alignment concavities at an end face thereof.

* * * * *

UNITED STATES PATENT AND TRADEMARK OFFICE
CERTIFICATE OF CORRECTION

PATENT NO.         : 9,033,590 B2                              Page 1 of 1
APPLICATION NO.    : 13/660102
DATED              : May 19, 2015
INVENTOR(S)        : Ootorii et al.

It is certified that error appears in the above-identified patent and that said Letters Patent is hereby corrected as shown below:

On the title page item [54] reads

"CONNECTOR WITH OPTICAL AND ELECTRICAL TRANSMISSION CONNECTORS AND ELECTRONICS APPARATUS UTILIZING SAME"

Should read

--CONNECTOR WITH OPTICAL AND ELECTRICAL TRANSMISSION CONNECTORS AND ELECTRONIC APPARATUS UTILIZING SAME--

Signed and Sealed this
Twentieth Day of October, 2015

Michelle K. Lee
*Director of the United States Patent and Trademark Office*